United States Patent
Sasaki et al.

(10) Patent No.: US 6,839,119 B2
(45) Date of Patent: Jan. 4, 2005

(54) DISPLAY DEVICE

(75) Inventors: Yasushi Sasaki, Saitama-ken (JP); Katsuhiko Inada, Saitama-ken (JP); Tetsuo Morita, Saitama-ken (JP); Koichi Shiba, Saitama-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 70 days.

(21) Appl. No.: 10/440,167

(22) Filed: May 19, 2003

(65) Prior Publication Data

US 2003/0234902 A1 Dec. 25, 2003

(30) Foreign Application Priority Data

May 29, 2002 (JP) ........................................ 2002-156093

(51) Int. Cl.[7] .............................................. G02F 1/13
(52) U.S. Cl. ........................ 349/149; 349/152; 345/51
(58) Field of Search ................................ 349/149, 152; 345/51

(56) References Cited

U.S. PATENT DOCUMENTS 6,683,591 B2 * 1/2004 Hashimoto et al. ........... 345/87
6,734,940 B2 * 5/2004 Hirabayashi ................ 349/149
2003/0117567 A1 * 6/2003 Jung et al. .................. 349/149

* cited by examiner

Primary Examiner—James A. Dudek
(74) Attorney, Agent, or Firm—Oblon, Spivak, McClelland, Maier & Neustadt, P.C.

(57) ABSTRACT

A display device includes a substrate (100), pixel electrodes (PIX) formed on the substrate (100), scanning lines (G) to transmit scanning signals, signal lines (S) divided into four groups (LL, LR, RL and RR) to transmit data signals, signal line driving circuits (112) to drive the groups (LL, LR, RL and RR) of the signal lines (S), respectively, analog switch control signal lines (107 and 108) connected between the signal line driving circuits (112) and the groups (LL, LR, RL and RR) of the signal lines (S), and transistors (ASW) connected between the analog switch control signal lines (107 and 108) and the groups (LL, LR, RL and RR) of the signal lines (S) to provide the data signals to the pixel electrodes (PIX) in response to the scanning signals. An electrical path length between the signal line driving circuits (112) and a point (A) of the analog switch control signal lines (107 and 108) provided at a boundary region between the groups (LL and LR), for example, of the signal lines (S) is configured to be substantially the same as the one between the signal line driving circuits (112) and a point (B) of the analog switch control signal lines (107 and 108) provided at a boundary region between the groups (LL and LR) of the signal lines (S).

6 Claims, 8 Drawing Sheets

DISPLAY DEVICE

FIELD OF THE INVENTION

This invention generally relates to a display device and, more particularly, to a flat panel display device with a substantially uniform display on its entire screen.

BACKGROUND OF THE INVENTION

An active matrix type liquid crystal display (LCD) device has thin film transistors (TFTs) to control pixels to read data signals. Where amorphous silicon TFTs are used in LCD devices, tape carrier packages (TCPs) are connected to the LCD devices to drive the pixels. The TCP includes integrated circuits provided on flexible printed circuit boards to drive signal lines and scanning lines. Where this TCP is connected to terminals of a TFT array substrate, the integrated circuits to drive the signal and scanning lines are connected to the pixels corresponding to the TFTs provided on the TFT array substrate, respectively.

FIG. 6 is a circuit diagram of a prior art amorphous silicon TFT LCD. FIG. 7 is its block diagram to show schematically the relationship between divided display regions and signal line control circuits.

A TFT LCD basically consists of a TFT array substrate, a counter substrate provided opposite to the TFT array substrate and a liquid crystal layer held between the TFT array and counter substrates. With reference to FIG. 6 the TFT array substrate 100 includes a display area 101 in which scanning lines G1, G2, G3, . . . , Gm (collectively called "G") and signal lines S1, S2, S3, . . . , Sn (collectively called "S") are disposed in a matrix form and a pixel TFT 102 and a pixel electrode 103 are provided in the vicinity of intersection of the matrix. The counter substrate includes a counter electrode 104 facing the pixel electrode 103. The liquid crystal layer 105 is provided between the pixel and counter electrodes 103 and 104. Further, the pixel electrode 103 is connected in parallel to an auxiliary capacitor 106 to which an operating voltage is supplied through an auxiliary capacitor line.

The display area 101 is coupled to signal line control circuits 111, and integrated circuits 115 for driving scanning lines. The display area 101 is divided into 4 blocks LL, LR, RL and RR as shown in FIG. 7. A predetermined number of the signal lines S are assigned to each block to which data signals are supplied from the signal line control circuit 111. For the sake of simplicity FIG. 7 schematically shows signal line driving integrated circuits and analog switch control signal lines 107 and 108.

As shown in FIG. 6, the signal line control circuit 111 has the signal line driving circuit 112 and a signal line switching circuit 113. The signal line driving circuit 112 serially supplies data signals to a group of signal lines S allocated to each block. The signal line switching circuit 113 sends a data signal to each signal line in the group of signal lines during one horizontal scanning period. The signal line driving circuits 112 are provided in TCPs 120-1, 120-2, 120-3 and 120-4. The signal line switching circuits 113 are, however, formed on the TFT array substrate 100. The TCPs 120-1, 120-2, 120-3 and 120-4 each are connected between the terminals of the TFT array substrate 100 and an outer printed circuit board 200.

The integrated circuits 115 for driving the scanning lines sequentially output scanning signals to turn on the pixel TFTs 102, so that the data signals are read in the pixels from the signal lines S The integrated circuits 115 are provided in TCPs 130-1 and 130-2, which are, in turn, connected between the terminals of the TFT array substrate 100 and an outer printed circuit board 300.

The outer printed circuit board 200 includes a control integrated circuit 201, interface circuits, a power source, etc. The control integrated circuit 201 outputs control signals at various timings and data signals in synchronization with such control signals in response to clock, timing and digital data signals, etc. supplied from outside application devices. The control and data signals and a power source voltage from the control integrated circuit 201 are not shown but also provided to the integrated circuits 115.

The TFT array substrate 100 is provided opposite to the counter substrate, not shown, with a predetermined gap, the TFT array and counter substrate are tightly put together, their peripheral portions are sealed by sealant, and a liquid crystal material is injected into the gap to complete an LCD device.

FIG. 8 is a circuit diagram of the signal switching circuit 113 for the block LL, LR, RL or RR. Two adjacent signal lines S1 and S2 are commonly connected to a signal line D1 through analog switches ASW1 and ASW2. Similarly, two adjacent signal lines Si-1 and Si are commonly connected to a signal line Dj, (collectively called "D", "j"=1, 2, . . . , and i/2, and "i"=the number of signal lines assigned to each block LL.LR.RL or RR), through analog switches ASWi-1 and ASWi, (collectively called "ASW", "i"=1, 2, . . . , and n/4, and "n"=the number of total signal lines). The analog switches ASW are controlled by signal line control signals ASW1U and ASW2U provided from the control integrated circuit 201 through the signal line driving circuits 112. When the analog switch ASWi turns on, a DATA SIGNAL j supplied to signal line Dj is transferred to the pixel PIX i through the signal line Si. Control electrodes of the analog switches ASW1, ASW3, . . . , and ASWi-1 are connected to an analog switch control signal line 107 but those of the analog switches ASW2, ASW4, . . . , and ASWi are connected to another analog switch control signal line 108. The analog switches ASW are controlled in response to the control signal ASW1U or ASW2U.

FIG. 9 is a timing chart of a driving scheme of the signal line switching circuit 113 for the block LL, LR, RL or RR. During the former half of a horizontal scanning period the control signal ASW1U becomes a level to turn on the analog switches ASW2, ASW4, . . . , and ASWi and data signal DATA2, DATA4, . . . , and DATAj (collectively called "DATA A") are read in the pixels PIX2, PIX4, . . . , and PIXi, respectively. During the latter half of the horizontal scanning period, however, the control signal ASW2U becomes such a level to turn on the analog switches ASW1, ASW3, . . . , and ASWi-1 and data signal DATA1, DATA3, . . . , and DATAj-1 (collectively called "DATA B") are read in the pixels PIX1, PX3, . . . , and PIXi-1, respectively. Here, for convenience PIX1, PIX2, PIX3, PIXi are collectively called "PIX". Further, this driving scheme is called a signal line selection system. It can reduce the number of signal lines S connected between the outer application device and the TFT array substrate 100. Further, the number of signal control lines is not only limited to two but also can be three or more.

The control signals ASW1U and ASW2U are supplied to the analog switches ASW from the control integrated circuit 201 in the outer printed circuit board 200 through connecting lines including the analog switch control signal lines 107 and 108. Since the analog switch control signal lines 107 and 108 formed on the TFT array substrate 100 are made of metal, such as MoTa, Cr, MoW, Alzr, Al, or the like and have narrow, complicated layout requirements, the lines have much higher electrical resistance than those connected to the control integrated circuits 201 and signal line driving circuits 112. Thus, electrical path lengths of points A and B shown in FIG. 7 from the signal line driving circuits 112 are different from each other. As a result, signal delays at the points A and B cause the pixels to read distorted data. In other words, the analog switches ASW for adjacent pixels are distinctively different in conductive state in the boundary region between the blocks LL and LR, for example, so that such different conductive states lead to lack of uniform display.

SUMMARY OF THE INVENTION

An object of the present invention is to provide a display device which adapts a signal line selection system for a plurality of blocks and is capable of solving such lack of uniform display in the boundary region between the blocks.

According to one aspect of the present invention, a display device includes a substrate, pixel electrodes formed on the substrate, scanning lines to transmit scanning signals, signal lines divided into at least first and second groups to transmit data signals, first and second signal line driving circuits to drive the groups of the signal lines, first control signal lines connected between the first signal line driving circuits and the first group of the signal lines, second control signal lines connected between the second signal line driving circuits and the second group of the signal lines and transistors connected between the first and second control signal lines and the first and second groups of the signal lines to provide the data signals to the pixel electrodes in response to the scanning signals, respectively.

A first electrical path length between the first driving circuits and a point of the first control signal lines provided at a boundary region between the first and second groups of the signal lines is configured to be substantially the same as a second electrical path length between the second driving circuits and a point of the second control signal lines provided at the boundary region.

The display device set forth above is characterized in that the first and second control signal lines are connected to make the first and second electrical path lengths substantially equal.

The display device is further characterized in that the first and second signal line driving circuits supply the data signal to central portions of the first and second control signal lines, respectively.

The display device is still further characterized in that the first control signal lines are commonly connected the second control signal lines and the first signal line driving circuit supplies the data signal to an end portion of the first control signal lines.

The display device is also characterized in that the first and second control signal lines are independently connected to central portions of the first and second signal line control circuits, respectively.

The display device further includes coupling lines formed on the substrate, an insulation film to cover the substrate and the coupling lines, and electrically contacting members provided in the insulation film to connect the coupling lines to the first and second control signal lines.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED EXPLANATION OF THE PREFERRED EMBODIMENTS

Figure 6:
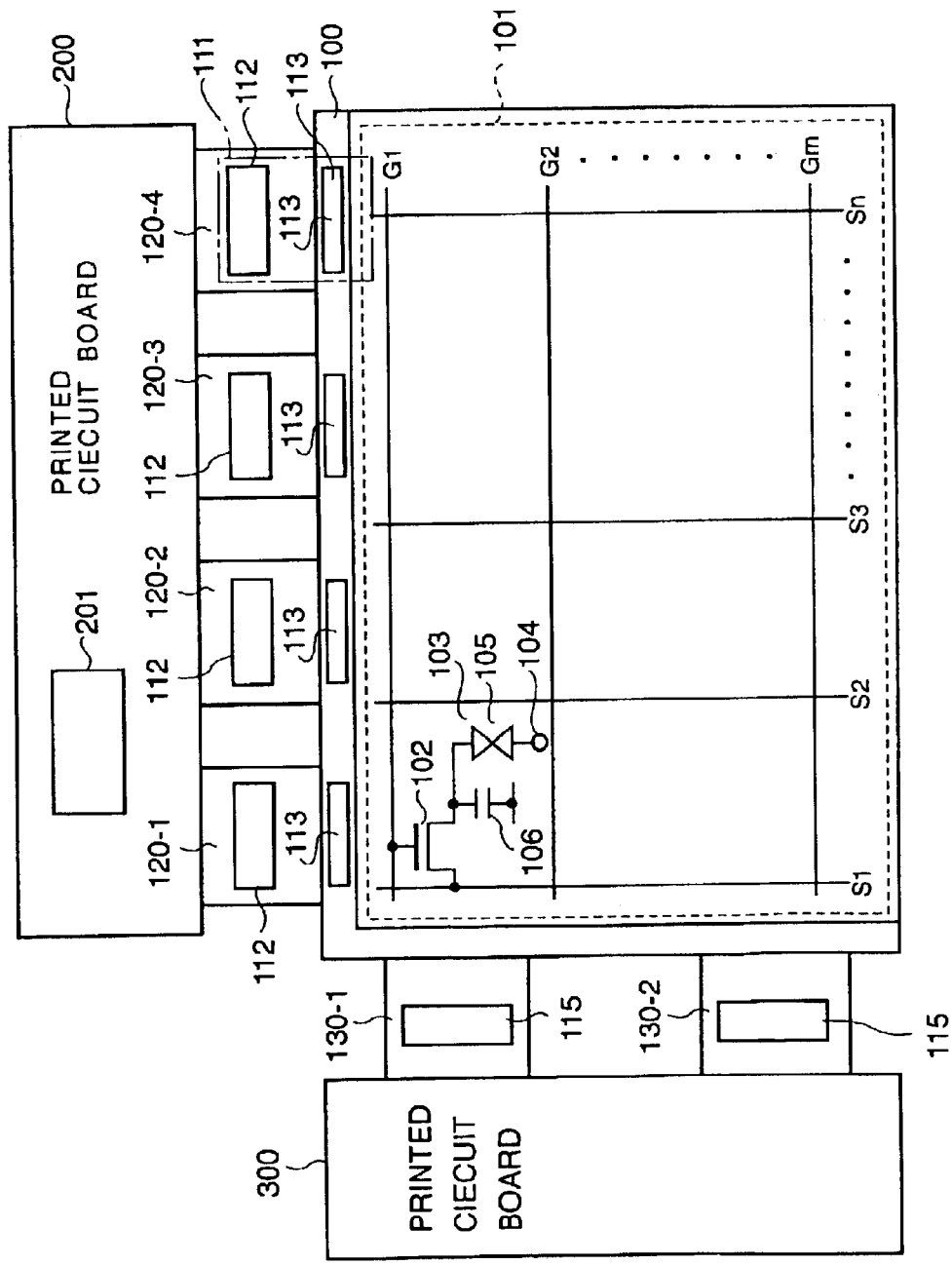
FIG. 6 is a circuit diagram of a prior art amorphous silicon TFT LCD device.
Figure 7:
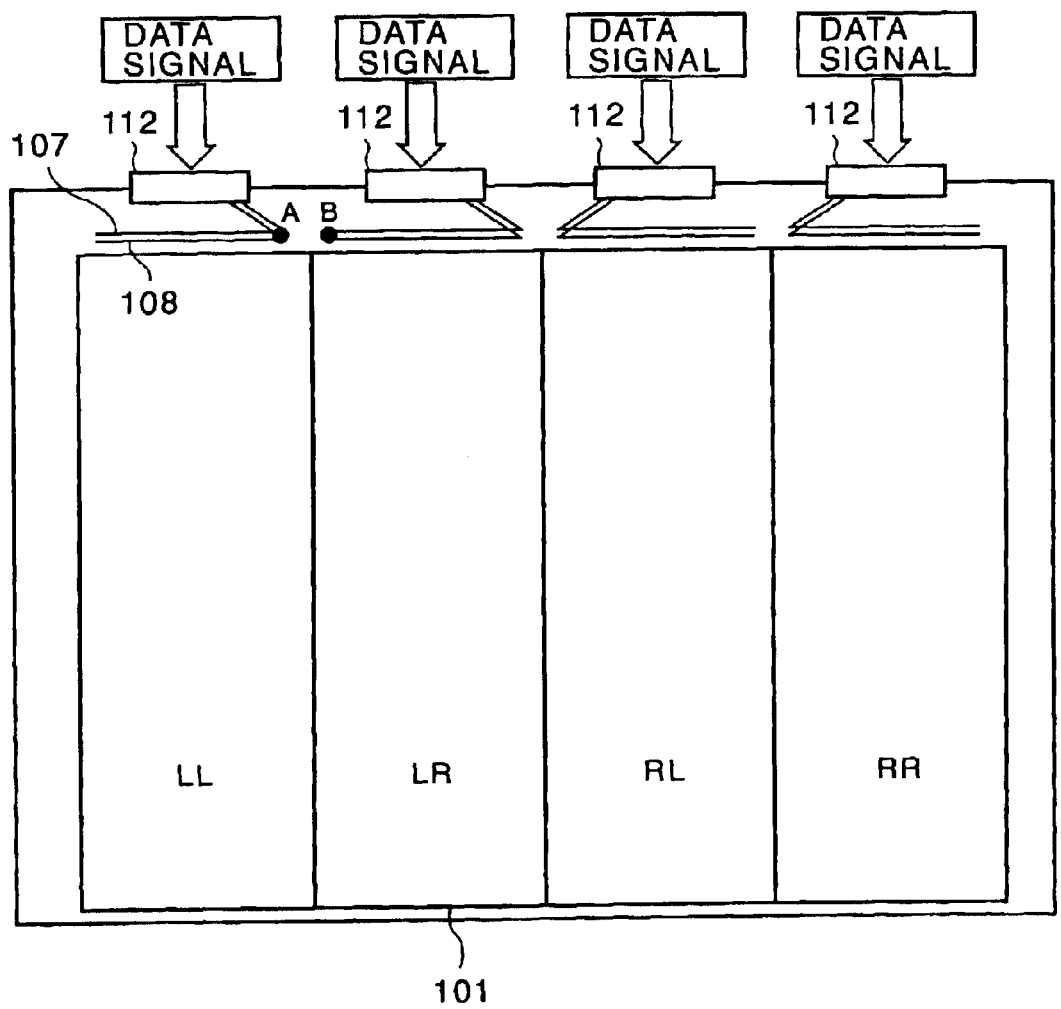
FIG. 7 is a block diagram of the LCD device shown in FIG. 6.
Figure 8:
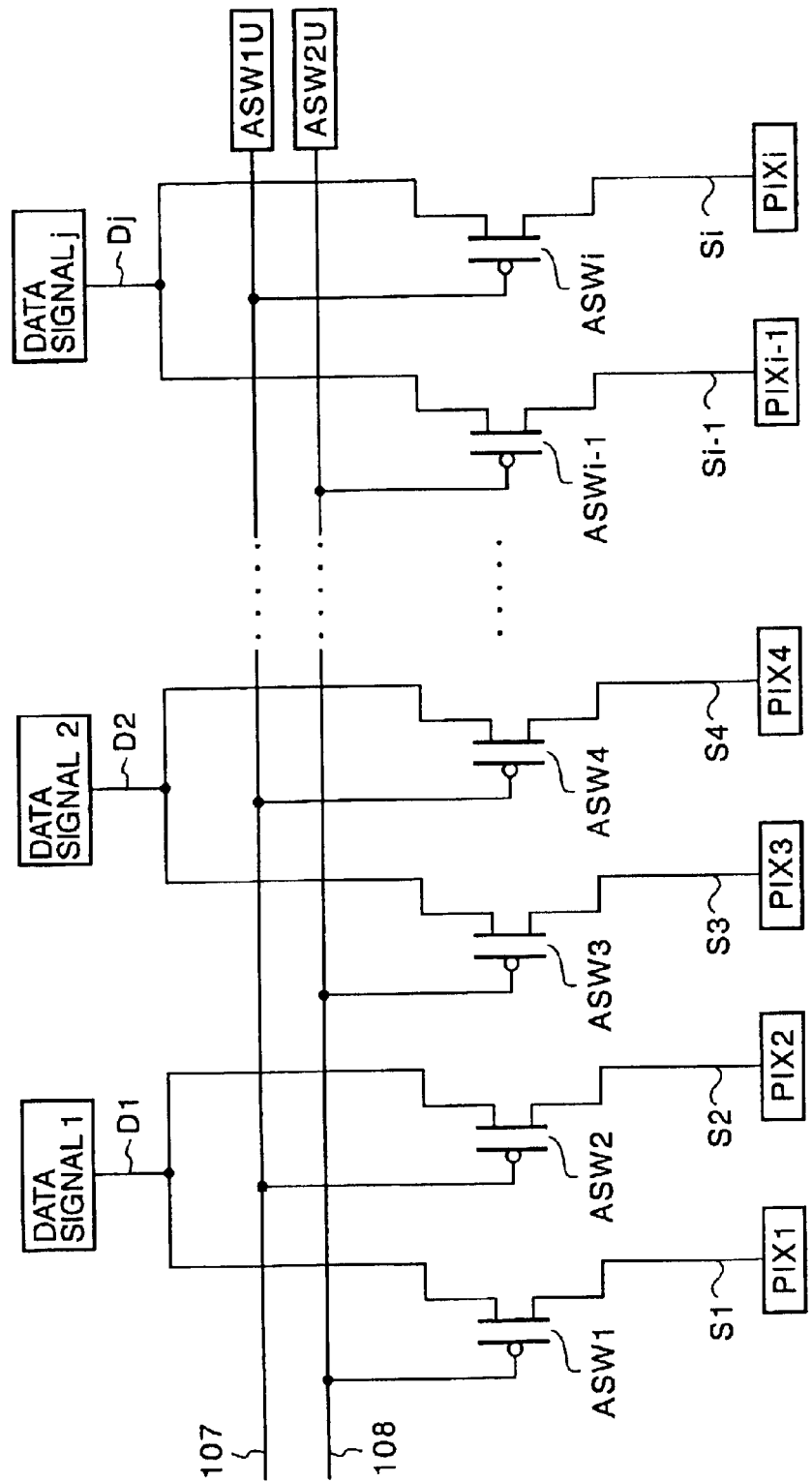
FIG. 8 is a circuit diagram of a signal line switching circuit of the LCD device shown in FIGS. 6 and 7.
Figure 9:
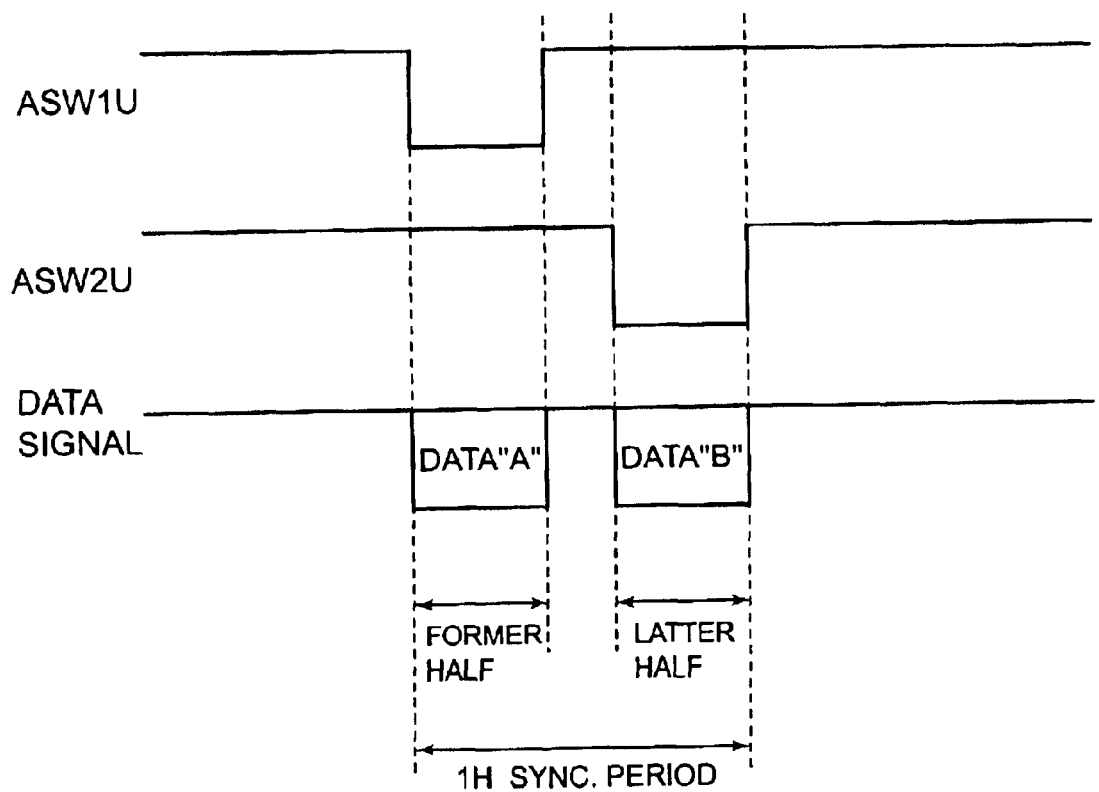
FIG. 9 is a timing chart of a driving scheme of the signal line switching circuit shown in FIG. 8.

Electrode substrates for display devices of embodiments in accordance with the present invention will be explained below with reference to the drawings. The LCD devices of the embodiments have the structure similar to those shown in FIGS. 6 7 and 8. Distinctive structures of the embodiments will be described with reference to FIGS. 1 to 5 each corresponding to FIG. 7 in which reference numerals in the former are the same as those in the latter. Only signal line driving integrated circuits 112 for driving signal lines S and analog switch control signal lines 107 and 108 are shown in FIGS. 1 to 4 as components of a signal line control circuit 111.

First Embodiment

Figure 1:
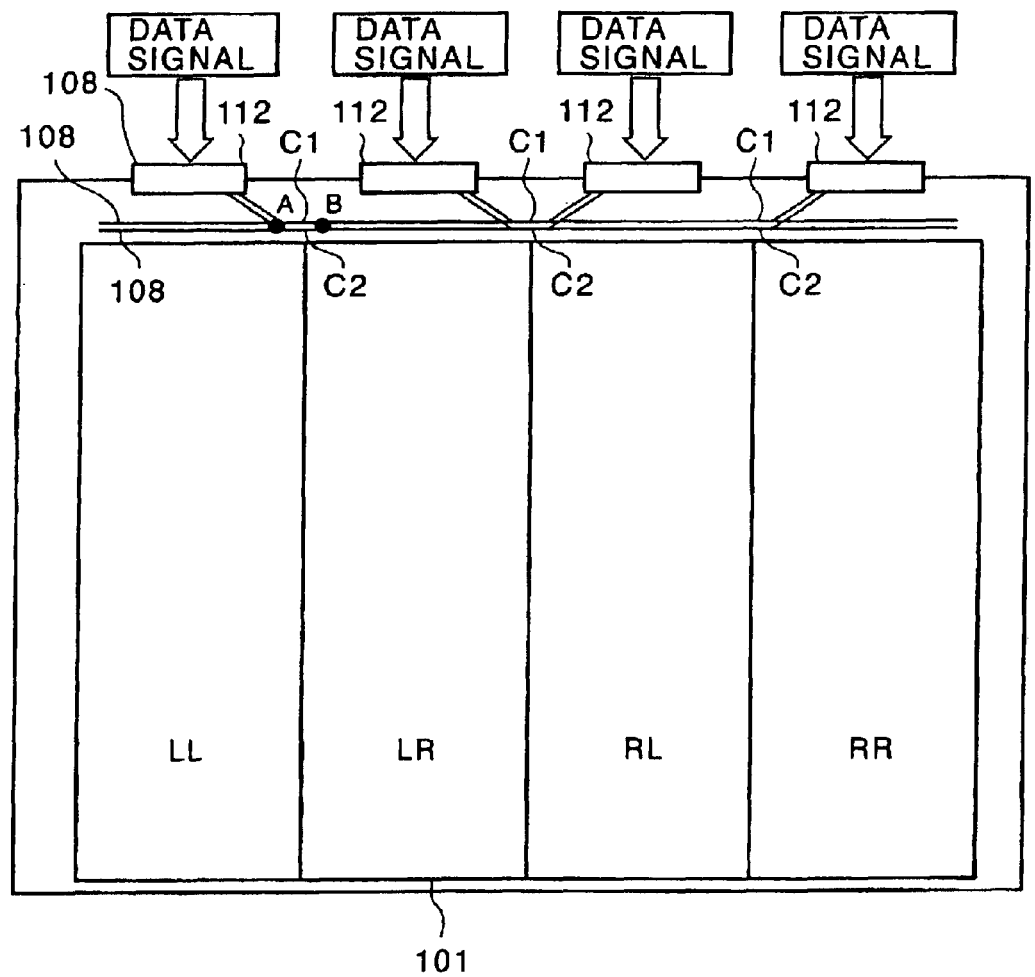
FIG. 1 is a block diagram of an LCD device in accordance with a first embodiment of the present invention.

FIG. 1 is a block diagram of an LCD device of a first embodiment and shows the relationship between divided display blocks LL, LR, RL and RR and signal line driving circuits 112.

The analog switch control signal lines 107 and 108 are commonly connected to all the signal line driving circuits 112, i.e., the analog switch control signal lines 107 and 108 of adjacent blocks are connected by couplers C1 and C2, respectively. The electrical path lengths from the signal line driving circuit 112 to terminals A and B of the analog switch control signal lines 107 and 108 in the boundary region of the adjacent blocks LL and LR, for example, are set to be substantially equal. Thus, analog switches, not shown, between adjacent blocks become equally conductive in states and control signals ASW1U and ASW2U are not subject to significant changes in the boundary region of the blocks, so that displays on the adjacent pixels display are uniform.

Where the screen size is wide and divided into a lot of blocks, the same connecting method is applicable to a group of blocks to implement substantially the same effect as set forth above.

Second Embodiment

Figure 2:
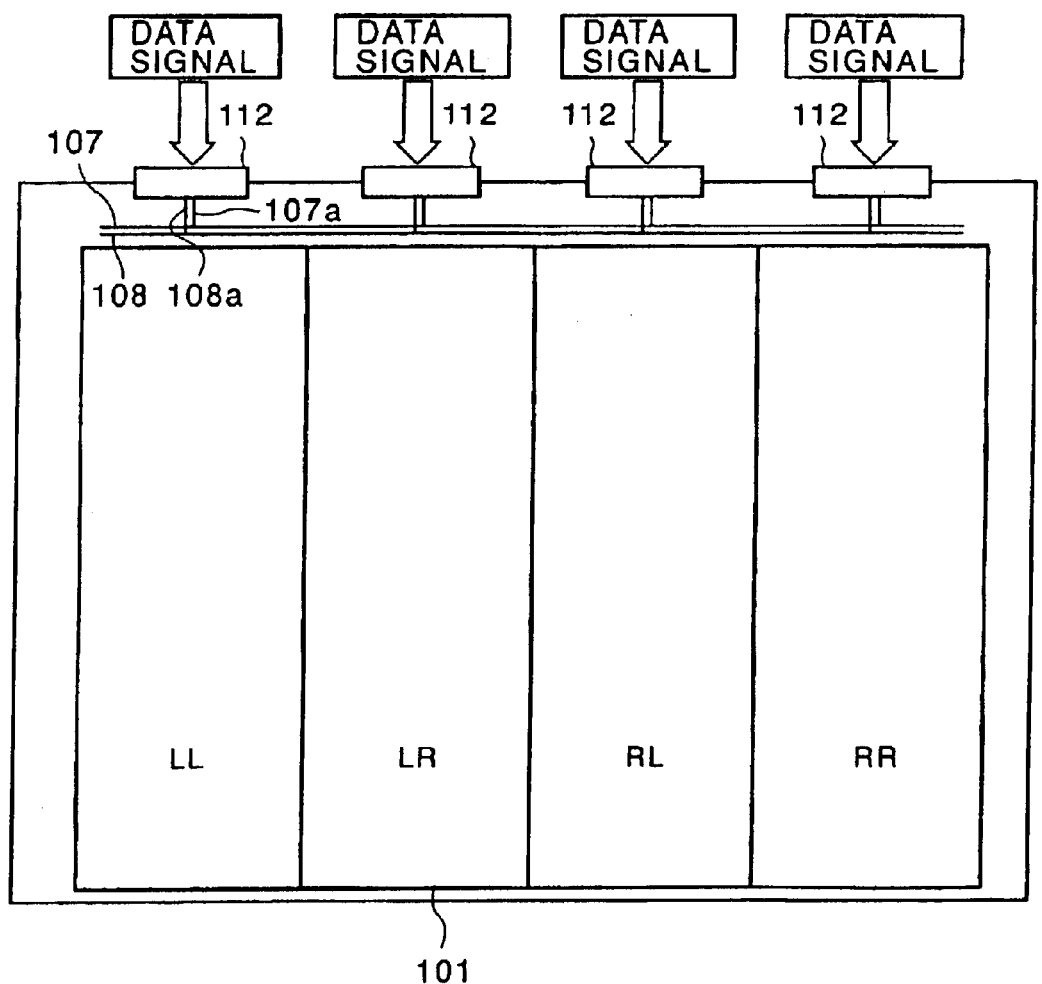
FIG. 2 is a block diagram of an LCD device in accordance with a second embodiment of the present invention.

FIG. 2 is a block diagram of an LCD device of a second embodiment and shows the relationship between divided display blocks LL, LR, RL and RR and signal line driving circuits (IC) 112.

The analog switch control signal lines 107 and 108 are commonly connected to all the signal line driving circuits 112 and analog switch control signal lines 107a and 108a are connected between the signal line driving circuits 112 and central portions of the analog switch control signal lines 107 and 108 assigned to each block LL, LR, RL or RR. Analog switches, not shown, in the boundary region between adjacent blocks become equally conductive in states and control signals ASW1U and ASW2U are not subject to significant changes there, so that displays on the adjacent pixels are uniform.

Third Embodiment

Figure 3:
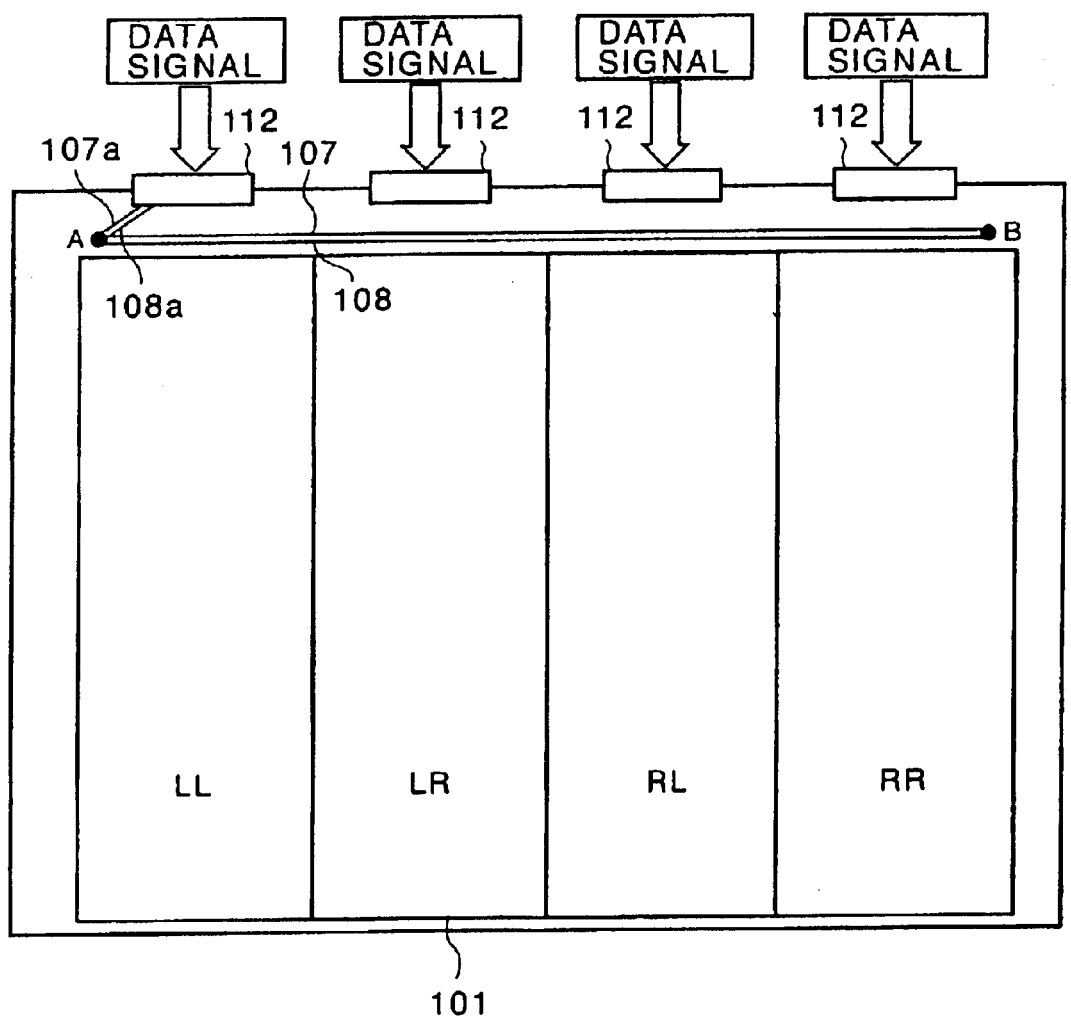
FIG. 3 is a block diagram of an LCD device in accordance with a third embodiment of the present invention.

FIG. 3 is a block diagram of an LCD device of a third embodiment and shows the relationship between divided display blocks LL, LR, RL and RR and signal line driving circuits 112.

The analog switch control signal lines 107 and 108 are commonly connected to all the signal line driving circuits 112 and analog switch control signal lines 107a and 108a are connected to the signal line driving circuits 112 at a point corresponding to the block LL. The electrical path lengths from the signal line driving circuits 112 to terminals A and B are different and displays on the pixels are not uniform between the terminals A and B. The displays in the boundary regions between adjacent pixels are, however, not subjected to any significant changes. As a result, the total display of this embodiment is more uniform than that of the prior art LCD device.

Alternatively, the analog switch control signal lines 107 and 108 may be connected to the right end of the block RR or central portions of the analog switch control signal lines 107 and 108 to obtain similar effects to this embodiment.

Fourth Embodiment

Figure 4:
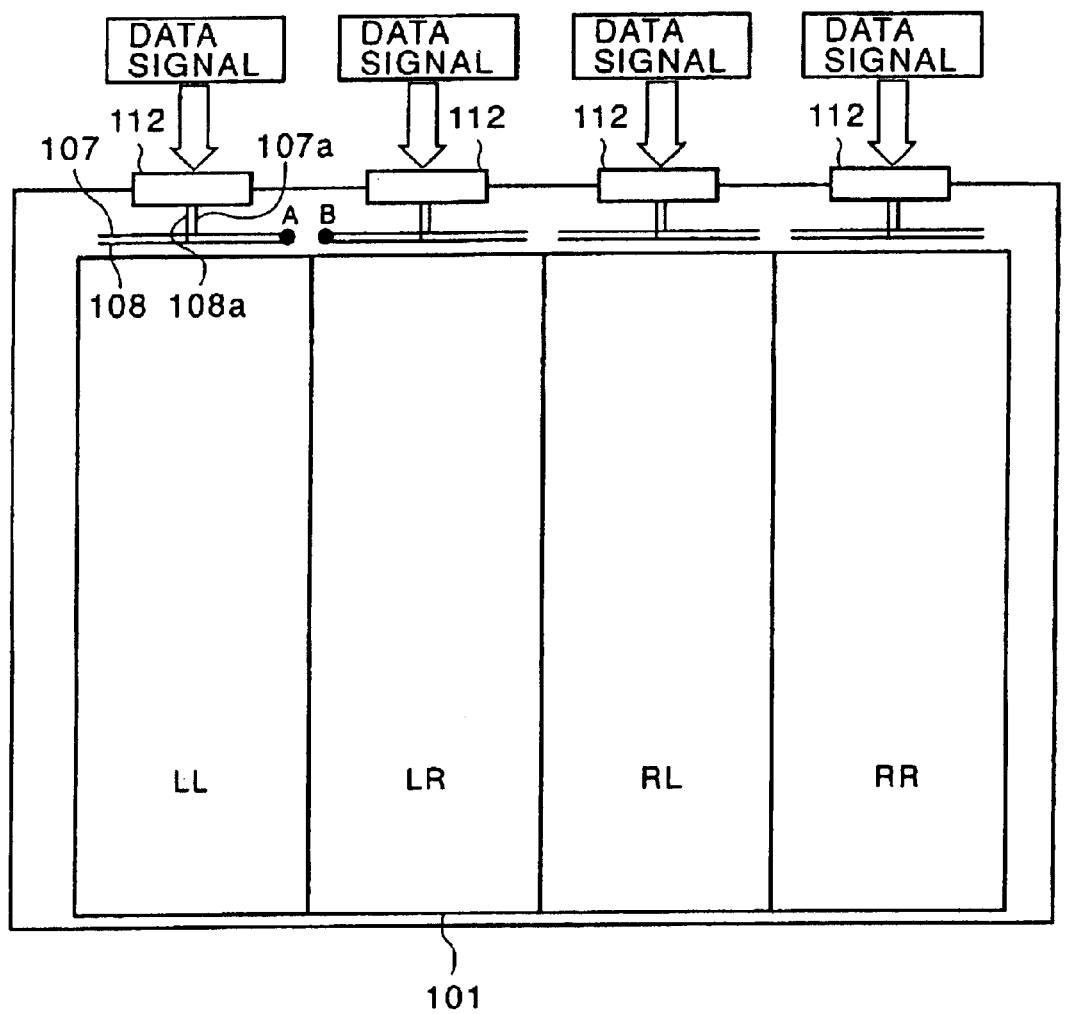
FIG. 4 is a block diagram of an LCD device in accordance with a fourth embodiment of the present invention.

FIG. 4 is a block diagram of an LCD device of a third embodiment and shows the relationship between divided display blocks LL, LR, RL and RR and signal line driving circuits 112.

The analog switch control signal lines 107 and 108 are connected to the signal line driving circuits 112 individually per block and analog switch control signal lines 107a and 108a are connected between the signal line driving circuit 112 and a central portion of the block LL, LR, RL or RR. The electrical path lengths from the signal line driving circuit 112 to the terminals A and B each are substantially equal. The analog switches in the boundary region between adjacent blocks also operate substantially equally. As a result, displays in the boundary region between adjacent blocks become uniform.

Figure 5:
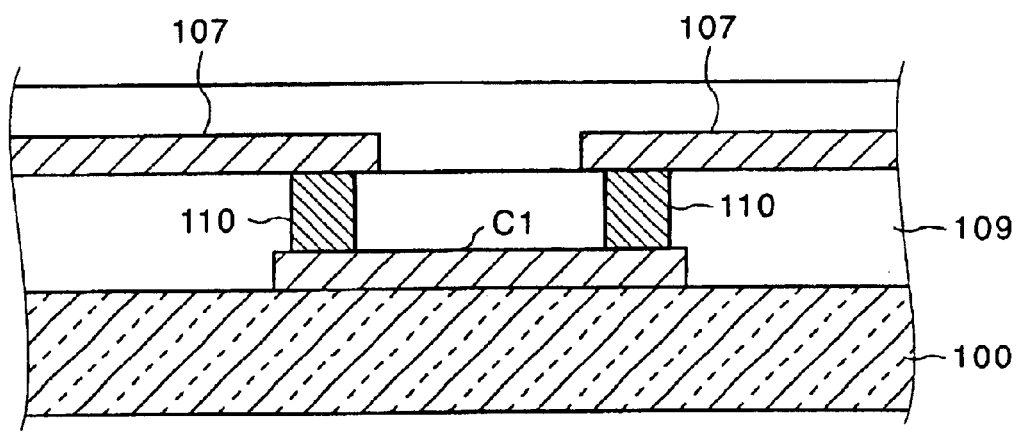
FIG. 5 is a sectional view of a TFT array substrate in accordance with a fifth embodiment of the present invention.

Next, the coupler C1 which commonly connects analog switch control signal lines 107 and 108 will be explained below. FIG. 5 is a sectional view of a part of the TFT array substrate 100 used for the first embodiment.

As shown in FIG. 5, adjacent analog switch control signal lines 107 in the boundary region between the blocks are formed on an insulation film 109 of the TFT array substrate 100. Two contact holes are perforated in the insulation film 109 and the coupler C1 is prepared on the substrate 100. The analog switch control signal lines 107 are electrically connected to each other by the coupler C1 through the contact members, e.g., contact holes 110. Since the coupler C1 is made of the same layer as the scanning lines G shown in FIG. 6, they are formed in the same process. The analog signal switch control signal line 108 in the boundary region between the blocks is the same in structure as the analog switch control signal line 107 shown in FIG. 5, so that the analog switch control signal lines 107 and 108 are commonly formed with the same structure.

According to the present invention, electrical path lengths from the control circuits to the switching circuits in the boundary region between pixel blocks remain substantially equal, data signals can be sufficiently read in the pixel and displays in the boundary region are substantially uniform.

What is claimed is:

1. A display device comprising:

a substrate;

pixel electrodes formed on said substrate;

scanning lines to transmit scanning signals;

signal lines divided into at least first and second groups to transmit data signals;

first and second signal line driving circuits to drive said first and second groups of said signal lines, respectively;

first control signal lines connected between said first signal line driving circuits and said first group of said signal lines;

second control signal lines connected between said second signal line driving circuits and said second group of said signal lines; and transistors connected between said first and second control signal lines and said first and second groups of said signal lines to provide said data signals to said pixel electrodes in response to said scanning signals, respectively;

wherein a first electrical path length between said first signal line driving circuits and a component of said first control signal lines provided at a boundary region between said first and second groups of said signal lines is configured to be substantially the same as a second electrical path length between said second signal line driving circuits and a component of said second control signal lines provided at said boundary region.

2. The display device according to claim 1, wherein said first and second control signal lines are connected to make said first and second electrical path lengths substantially equal.

3. The display device according to claim 1, wherein said first and second signal line driving circuits supply said data signal to, central portions of said first and second control signal lines, respectively.

4. The display device according to claim 1, wherein said first control signal lines are commonly connected to said second control signal lines and said first signal line driving circuits supply said data signal to an end portion of said first control signal lines.

5. The display device according to claim 1, wherein said first and second signal line driving circuits are independently connected to central portions of said first and second control signal lines, respectively.

6. The display device according to claim 1, further comprising: coupling lines formed on said substrate; an insulation film to cover said substrate and said coupling lines; and electrically contacting members provided in said insulation film to connect said coupling lines to said first and second control signal lines.

* * * * *